(12) United States Patent
Uchida et al.

(10) Patent No.: US 11,686,385 B2
(45) Date of Patent: Jun. 27, 2023

(54) SHIFT DEVICE

(71) Applicant: AISIN CORPORATION, Kariya (JP)

(72) Inventors: Yutaka Uchida, Kariya (JP); Atsuto Ogino, Kariya (JP)

(73) Assignee: AISIN CORPORATION, Kariya (JP)

( * ) Notice: Subject to any disclaimer, the term of this patent is extended or adjusted under 35 U.S.C. 154(b) by 590 days.

(21) Appl. No.: 16/817,826

(22) Filed: Mar. 13, 2020

(65) Prior Publication Data

US 2020/0378495 A1    Dec. 3, 2020

(30) Foreign Application Priority Data

May 29, 2019    (JP) ................................. 2019-100234

(51) Int. Cl.
*F16H 61/02*    (2006.01)
*F16H 59/08*    (2006.01)
*F16H 61/32*    (2006.01)

(52) U.S. Cl.
CPC ............ *F16H 61/32* (2013.01); *F16H 59/08* (2013.01); *F16H 61/0204* (2013.01); *F16H 2061/326* (2013.01)

(58) Field of Classification Search
CPC ...... F16H 59/08; F16H 61/0204; F16H 61/32; F16H 2061/0225; F16N 2061/0087; F16N 63/38
See application file for complete search history.

(56) References Cited

U.S. PATENT DOCUMENTS

| | | | | |
|---|---|---|---|---|
| 7,845,248 B2* | 12/2010 | Yoshiyama | ......... | F16H 63/3458 192/219.6 |
| 8,707,817 B2* | 4/2014 | Itazu | ................... | F16H 63/3466 74/473.12 |
| 8,789,643 B2* | 7/2014 | Iwami | ..................... | F16H 61/32 192/220.2 |
| 9,951,866 B2* | 4/2018 | Kuwahara | ............... | F16H 61/28 |
| 2005/0174084 A1* | 8/2005 | Nakai | ..................... | F16H 61/32 318/632 |

(Continued)

FOREIGN PATENT DOCUMENTS

JP    2016-075364 A    5/2016
WO    WO-2018123711 A1 *    7/2018    ............. F16H 61/32

OTHER PUBLICATIONS

U.S. Appl. No. 17/521,260 filed on Nov. 8, 2021.

*Primary Examiner* — Bobby Rushing, Jr.
(74) *Attorney, Agent, or Firm* — Sughrue Mion, PLLC

(57) ABSTRACT

A shift device includes: a shift switching member including valley parts corresponding to a shift position; a positioning member provided to establish the shift position in a state of being fitted into any one of the valley parts; a motor including a rotor and a stator and driving the shift switching member; a speed reduction mechanism section rotating the shift switching member in a state in which a rotation speed transmitted from the motor is reduced; a rotor rotational angle sensor detecting a rotational angle of the rotor; and an output shaft rotational angle sensor detecting a rotational angle of the shift switching member. The shift device detects the number of rotations of the motor based on association between output values of the output shaft rotational angle sensor and the rotor rotational angle sensor.

7 Claims, 7 Drawing Sheets

(56) References Cited

U.S. PATENT DOCUMENTS

2006/0103339 A1* 5/2006 Yamada .................. G05B 5/01
                                                    318/623
2007/0046243 A1* 3/2007 Hori ....................... F16H 61/32
                                                    318/630
2017/0335960 A1* 11/2017 Nagata .................... F16H 59/54

* cited by examiner

STATE OF BEING ABLE TO TRANSMIT DRIVING FORCE

STATE OF BEING UNABLE TO TRANSMIT DRIVING FORCE
(STATE OF BEING ABLE TO SWING)

| OUTPUT VALUE OF OUTPUT SHAFT ROTATIONAL ANGLE SENSOR | $Y(=2\pi \times n + \text{MOTOR ROTATIONAL ANGLE})$ |
|---|---|
| E1 | $Y1(=2\pi \times 1 + \theta 1)$ |
| E2 | $Y2(=2\pi \times 3 + \theta 2)$ |
| E3 | $Y3(=2\pi \times 5 + \theta 3)$ |
| E4 | $Y4(=2\pi \times 7 + \theta 4)$ |
| E5 | $Y5(=2\pi \times 6 + \theta 5)$ |
| E6 | $Y6(=2\pi \times 4 + \theta 6)$ |
| E7 | $Y7(=2\pi \times 1 + \theta 7)$ |
| E8 | $Y8(=2\pi \times 0 + \theta 8)$ |

SHIFT DEVICE

CROSS REFERENCE TO RELATED APPLICATIONS

This application is based on and claims priority under 35 U.S.C. § 119 to Japanese Patent Application 2019-100234, filed on May 29, 2019, the entire contents of which are incorporated herein by reference.

TECHNICAL FIELD

This disclosure relates to a shift device mounted on a vehicle.

BACKGROUND DISCUSSION

In the related art, a shift device mounted on a vehicle is known (for example, see JP 2016-75364A).

JP 2016-75364A discloses a shift device including an actuator unit that operates based on a control signal corresponding to a shift operation by an occupant, and a shift switching mechanism section that switches a shift position by being driven by the actuator unit. In the shift device described in JP 2016-75364A, the actuator unit includes a motor, a speed reduction mechanism section, a motor rotational angle sensor, an output shaft rotational angle sensor, and an engine control unit (ECU). Further, the actuator unit includes an output shaft provided on the output side of the speed reduction mechanism section. The motor rotational angle sensor detects a rotation amount (rotational angle) of the rotor. The output shaft rotational angle sensor detects an output angle (rotational angle) of the output shaft.

In JP 2016-75364A, the shift switching mechanism section includes a detent plate and a detent spring. The detent plate is a plate including a plurality of valley parts according to the shift position. The detent spring establishes the shift position in a state where the detent spring is fitted into any one of the plurality of valley parts of the detent plate. The detent plate is fixed to the lower end portion of the output shaft of the actuator unit. Then, the detent plate rotates integrally with the output shaft of the actuator unit.

In JP 2016-75364A, the motor is rotated based on a control signal from the ECU according to the operation of the operation section by the occupant, and the rotation of the motor is transmitted to the output shaft in a state of being reduced by the speed reduction mechanism section. Then, by rotating the detent plate together with the output shaft, the detent spring located at one valley part of the detent plate is moved to another valley part. Thereby, the shift position is switched.

Further, in the shift device of the related art described in JP 2016-75364A, the speed reduction ratio of the speed reduction mechanism section is set relatively high in order to improve the positioning accuracy of the detent spring with respect to the detent plate. For this reason, when the detent spring located at one valley part (such as a P position) of the detent plate is moved to another valley part (such as a D position), the motor rotates one or more times. Then, in the shift device of the related art described in JP 2016-75364A, the current (at the time of startup) motor rotational angle is detected based on the output from the motor rotational angle sensor when the ECU is started. However, at the time of startup, it is not possible to detect how many rotations the motor has made from a reference position (for example, the end point of the operation range of the detent spring). Therefore, in the shift device of the related art described in JP 2016-75364A, the number of rotations of the motor is stored in the nonvolatile memory when the ECU is stopped. Then, at the time of startup, the motor is controlled based on the number of rotations of the motor stored in the nonvolatile memory In the shift device of the related art described in JP 2016-75364A, the number of rotations of the motor is stored in the nonvolatile memory when the ECU is stopped. However, in some cases, such as when the motor is moved by an external force or the like when the ECU is not operating (after the ECU is stopped) or when the power supply fails while the motor is driving (that is, when the ECU is stopped without storing the current number of rotations of the motor in the nonvolatile memory), the number of rotations of the motor stored in the nonvolatile memory may be different from the actual number of rotations of the motor when the ECU is restarted. In this case, there is a problem that the positioning accuracy of the shift position is deteriorated because the number of rotations of the motor is erroneously recognized.

Thus, a need exists for a shift device which is not susceptible to the drawback mentioned above.

SUMMARY

A shift device according to an aspect of this disclosure is configured to be mounted on a vehicle, and includes a shift switching member that includes a plurality of valley parts corresponding to a shift position, a positioning member that is provided to establish the shift position in a state of being fitted into any one of the plurality of valley parts of the shift switching member, a motor including a rotor and a stator and driving the shift switching member, a speed reduction mechanism section that rotates the shift switching member in a state in which a rotation speed transmitted from the motor is reduced, a rotor rotational angle sensor that detects a rotational angle of the rotor, and an output shaft rotational angle sensor that detects a rotational angle of the shift switching member in which the shift device is configured to associate an output value of the output shaft rotational angle sensor and an output value of the rotor rotational angle sensor at a predetermined position of the positioning member with respect to at least one valley part of the plurality of valley parts and detect the number of rotations of the motor based on the association.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of disclosed here will be described based on the drawings.

First, the configuration of a shift device 100 according to the present embodiment will be described with reference to FIGS. 1 to 11.

Figure 1:
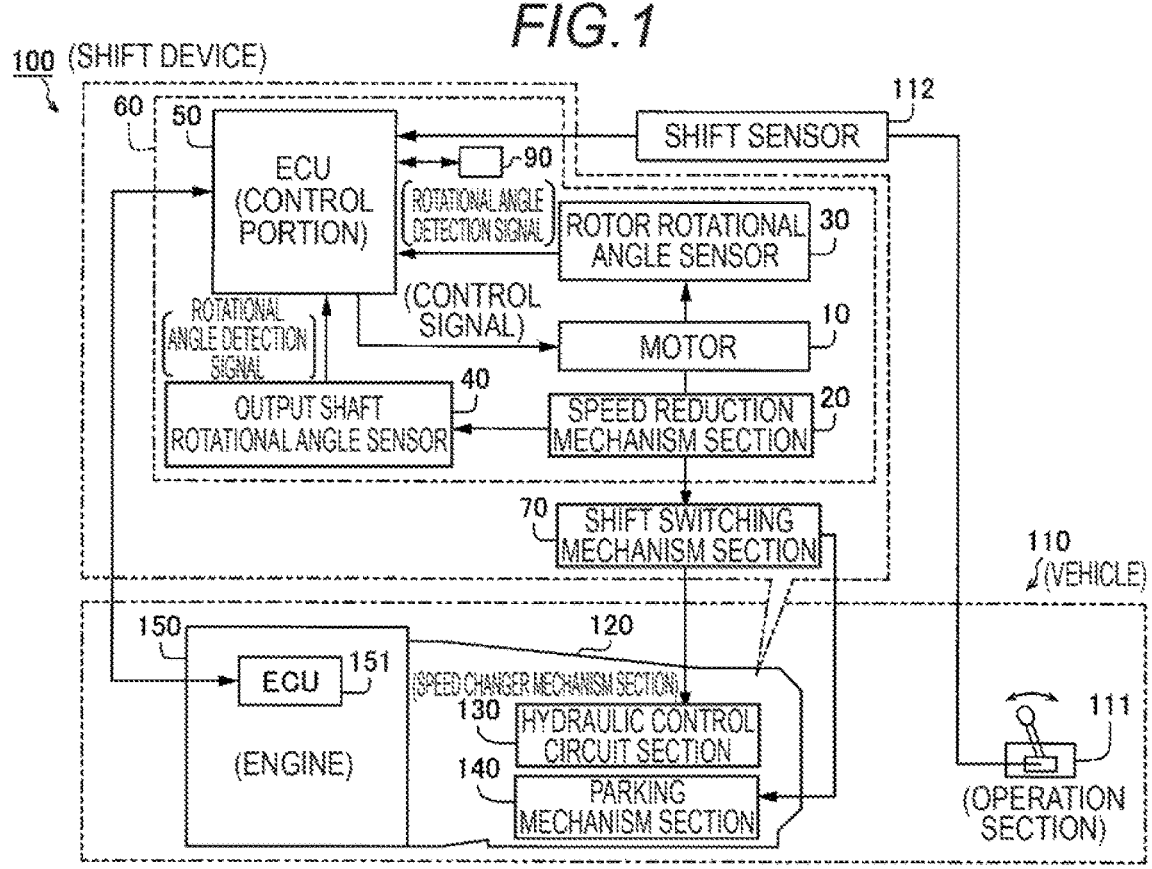
FIG. 1 is a block diagram showing a control configuration of a shift device according to an embodiment disclosed here.

The shift device 100 according to the present embodiment is mounted on a vehicle 110 such as an automobile. As shown in FIG. 1, in the vehicle 110, when the occupant (driver) performs a shift switching operation via an operation section 111 such as a shift lever (or a shift switch), electrical shift switching control for a speed changer mechanism section 120 is performed. That is, the position of the shift lever is input to the shift device 100 via a shift sensor 112 provided in the operation section 111. Then, based on a control signal transmitted from a dedicated ECU 50 provided in the shift device 100, the speed changer mechanism section 120 is switched to any shift position of a P (parking) position, an R (reverse) position, an N (neutral) position, and a D (drive) position corresponding to an occupant's shift operation. Such shift switching control is called shift-by-wire (SBW).

The shift device 100 includes an actuator unit 60 and a shift switching mechanism section 70 driven by the actuator unit 60. The shift switching mechanism section 70 is mechanically connected to a manual spool valve (not shown) of a hydraulic valve body in a hydraulic control circuit section 130 in the speed changer mechanism section 120 and to a parking mechanism section 140. The shift state (P position, R position, N position, and D position) of the speed changer mechanism section 120 is mechanically switched by driving the shift switching mechanism section 70.

Figure 2:
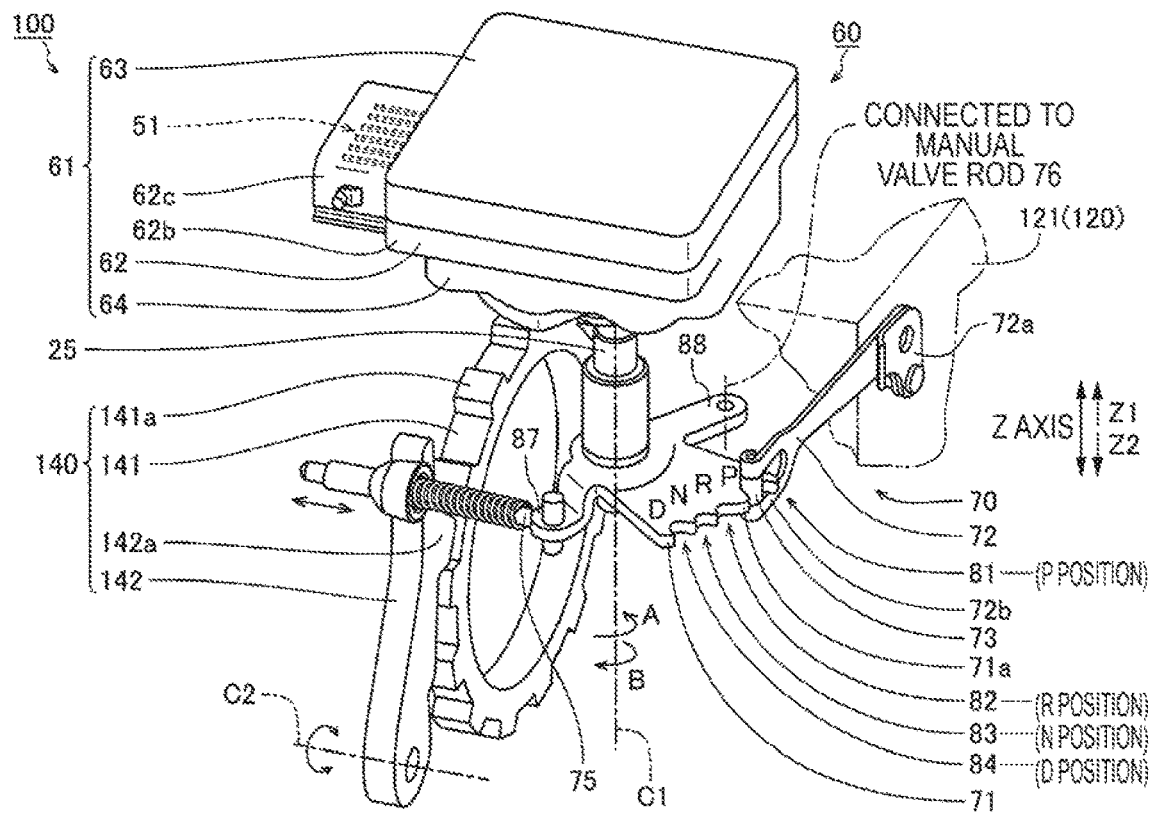
FIG. 2 is a perspective view schematically showing an entire configuration of the shift device according to the embodiment disclosed here.

The actuator unit 60 includes a motor 10, a speed reduction mechanism section 20, a rotor rotational angle sensor 30, an output shaft rotational angle sensor 40, and the ECU 50. As shown in FIG. 2, the ECU 50 is a substrate component in which an electronic component is mounted on a substrate 51. These components are housed in a box-shaped main body portion 61 fixed to the case of the speed changer mechanism section 120. Further, the actuator unit 60 includes an output shaft 25 connected to the output side of the speed reduction mechanism section 20.

The shift switching mechanism section 70 includes a detent plate 71 and a detent spring 72 as shown in FIG. 2. The detent spring 72 is configured to hold the detent plate 71 at a rotational angle position corresponding to each of the P position, the R position, the N position, and the D position. The detent plate 71 is an example of the "shift switching member" in the claims. The detent spring 72 is an example of the "positioning member" in the claims.

Figure 3:
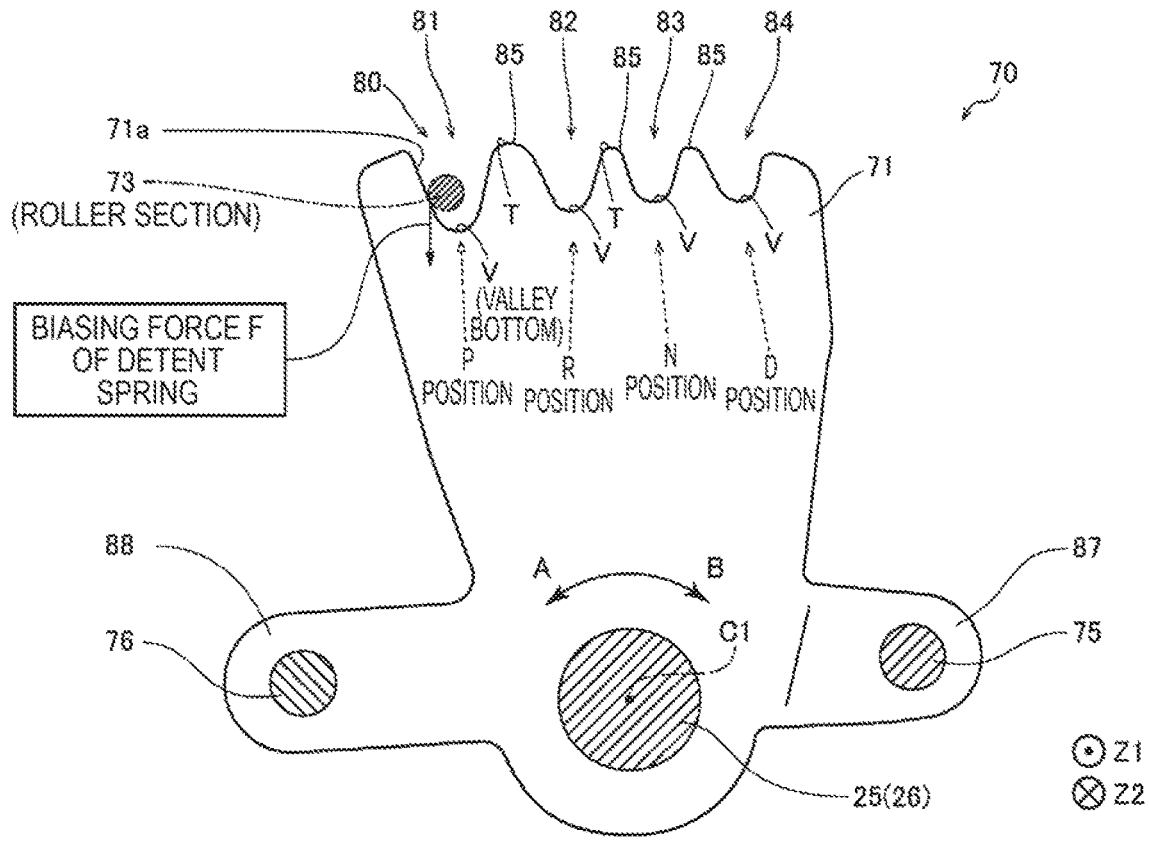
FIG. 3 is a diagram showing a structure of a detent plate included in the shift device according to the embodiment disclosed here.

As shown in FIG. 3, the detent plate 71 has four valley parts 80 (valley parts 81 to 84) provided corresponding to the shift positions (P position, R position, N position, and D position), respectively. Further, a cam face 71a having a continuous undulating shape is formed on the detent plate 71 by the valley parts 81 to 84. The valley parts adjacent to each other (for example, the valley part 81 and the valley part 82, the valley part 82 and the valley part 83) are separated by a peak part 85 having one top portion T. The detent spring 72 has a base end portion 72a fixed to a casing 121 (see FIG. 2) of the speed changer mechanism section 120 and a roller section 73 attached to the free end 72b. In the detent spring 72, the roller section 73 always presses the cam face 71a (the position of any one of the valley parts 81 to 84 or the peak part 85). Then, the detent spring 72 establishes the shift position in a state where the detent spring 72 is fitted into any one of the plurality of valley parts 81 to 84.

As shown in FIG. 2, the detent plate 71 is fixed to the lower end portion (Z2 side) of the output shaft 25, and the detent plate 71 is rotated around a rotation axis C1 integrally with the output shaft 25. As a result, the detent spring 72 is configured such that when the roller section 73 slides along the cam face 71a in accordance with the forward/reverse rotation (swing) of the detent plate 71 in the direction of arrow A or the direction of arrow B, the roller section 73 is fitted into any one of the valley parts 81 to 84 by the biasing force F of the detent spring 72. In addition, the detent spring 72 is configured to hold the detent plate 71 at the rotational angle position corresponding to the P position, the R position, the N position, or the D position by the roller section 73 being selectively fitted into any one of the valley parts 81 to 84 of the detent plate 71. Thereby, the P position, the R position, the N position or the D position are individually established.

The detent plate 71 further has an arm section 87 and an arm section 88. A park rod 75 is connected to the arm section 87, and a manual valve rod 76 (see FIG. 3) is connected to the arm section 88. When the detent plate 71 is rotated to the rotational angle position corresponding to the R position, the manual spool valve at the distal end portion of the manual valve rod 76 is moved to a position corresponding to the R position in the hydraulic valve body. Accordingly, a hydraulic circuit for the R position is formed in the hydraulic control circuit section 130 (see FIG. 1). For the other shift positions, similarly to the R position, the manual valve rod 76 (manual spool valve) is moved to a position corresponding to any one of the shift positions with the rotation of the detent plate 71, so that a hydraulic circuit corresponding to each shift position is formed within the hydraulic control circuit section 130.

As shown in FIG. 2, the parking mechanism section 140 includes a parking gear 141 connected to a crank shaft (not shown) of an engine 150, and a lock pawl 142 that engages with the parking gear 141. The lock pawl 142 is moved to a lock position and an unlock position as the park rod 75 moves. When the detent plate 71 is rotated to the rotational angle position corresponding to the P position, the lock pawl 142 is rotated around a rotation axis C2 to the lock position and a protruding portion 142a engages with a tooth bottom section 141a of the parking gear 141. As a result, free rotation of the parking gear 141 is restricted, and rotation of the crank shaft is restricted. When the detent plate 71 is rotated to a rotational angle position corresponding to a shift state (R, N, and D positions) other than the P position, the lock pawl 142 is rotated to the unlock position, and thereby the engagement between the lock pawl 142 and the parking gear 141 is released.

Next, a detailed configuration of the actuator unit 60 will be described.

Figure 4:
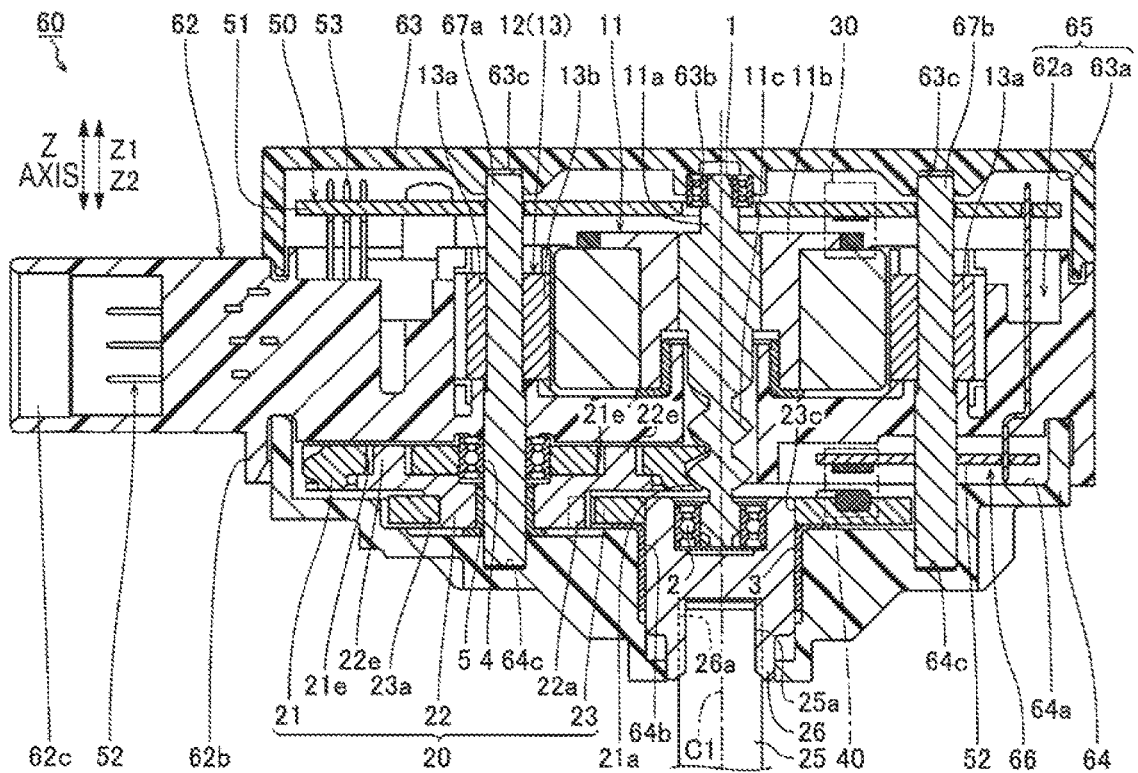
FIG. 4 is a sectional view showing an actuator unit constituting the shift device according to one embodiment disclosed here.

As shown in FIG. 4, the main body portion 61 of the actuator unit 60 includes a motor housing 62, a motor cover 63, and a gear housing 64. The motor housing 62 and the motor cover 63 made of resin having heat resistance are assembled in a state where a recess portion 62a and a recess portion 63a face each other, and thereby the motor 10 and the ECU 50 are housed in a motor chamber 65. Further, the gear housing 64 made of resin faces a recess portion 64a and is assembled from a side (Z2 side) opposite to the motor housing 62, and thereby the speed reduction mechanism section 20 is housed in a gear chamber 66.

A socket 62c having a terminal 52 is formed on one outer face 62b of the motor housing 62. The terminal 52 is electrically connected to the ECU 50 via a wiring 53. Then, electric power is supplied to the actuator unit 60 via a wiring cable (not shown) connected to the socket 62c. Further, an mutual communication between the ECU 50 and an ECU 151 (see FIG. 1) that controls the engine 150 is performed via the wiring cable. The ECU 50 is electrically connected to the motor 10 (see FIG. 1), the rotor rotational angle sensor 30 (see FIG. 1), and the output shaft rotational angle sensor 40 (see FIG. 1).

As shown in FIG. 4, the motor 10 has a rotor 11 rotatably supported with respect to a motor housing 62 and a stator 12 disposed around the rotor 11 so as to face each other with a magnetic gap therebetween. The motor 10 is configured to drive the detent plate 71.

As the motor 10, a surface permanent magnet type (SPM) three-phase motor in which a permanent magnet is incorporated on the surface of the rotor 11 is used. Specifically, the rotor 11 has a shaft pinion 11a and a rotor core 11b, and N-pole magnets and S-pole magnets as permanent magnets are alternately attached to the surface of the rotor core 11b around the rotation axis C1 at equal angular intervals (45°). Therefore, the number of poles of the motor 10 is eight.

An upper end portion (Z1 side) of the shaft pinion 11a is rotatably supported by a bearing member 1 disposed in a rotary shaft support section 63b of the motor cover 63, and a lower end portion (Z2 side) is rotatably supported by a bearing member 2 of an output bearing section 26 rotatably supported by a bearing member 3 press-fitted into the output shaft support section 64b. The bearing member 2 is disposed along the inner periphery of the recess portion at the upper end portion (Z1 side) of the output bearing section 26. Thereby, the shaft pinion 11a of the rotor 11 and the output shaft 25 are rotated around the same rotation axis C1. In the shaft pinion 11a, a gear section 11c in which gear grooves are formed in a helical shape is integrally formed in an outer peripheral region from a center portion to the lower end portion (Z2 side). The gear section 11c is a so-called helical gear with a small number of teeth having a small number of teeth and a large twist angle so that the gear diameter is sufficiently small.

As shown in FIG. 4, the stator 12 has a stator core 13 fixed in the motor chamber 65 of the motor housing 62 and excitation coils (not shown) of a plurality of phases (U phase, V phase and W phase) that generate a magnetic force by conduction.

As shown in FIG. 4, the stator core 13 integrally has a substantially cylindrical main body portion 13a having the same axial center as the shaft pinion 11a of the rotor 11 and a plurality (four) of teeth 13b protruding from an inner wall face of the main body portion 13a toward the axial center side. Of these teeth 13b, through holes are respectively formed in a pair of teeth 13b disposed on both sides in a radial direction opposite to each other about the axial center in parallel to the shaft pinion 11a. A rod-shaped support shaft 67a and a support shaft 67b inserted into a through hole of the motor housing 62 pass through the through holes. In the support shaft 67a and the support shaft 67b, a rear end portion (upper end portion in FIG. 4) is fitted into a recess portion 63c of the motor cover 63 and a front end portion (lower end portion in FIG. 4) is fitted into the recess portion 64c of the gear housing 64. Thus, the stator 12 is fixed in the motor chamber 65. Further, the support shaft 67a, the support shaft 67b, and the shaft pinion 11a are provided such that the axial centers thereof are parallel to each other along a Z direction.

Figure 5:
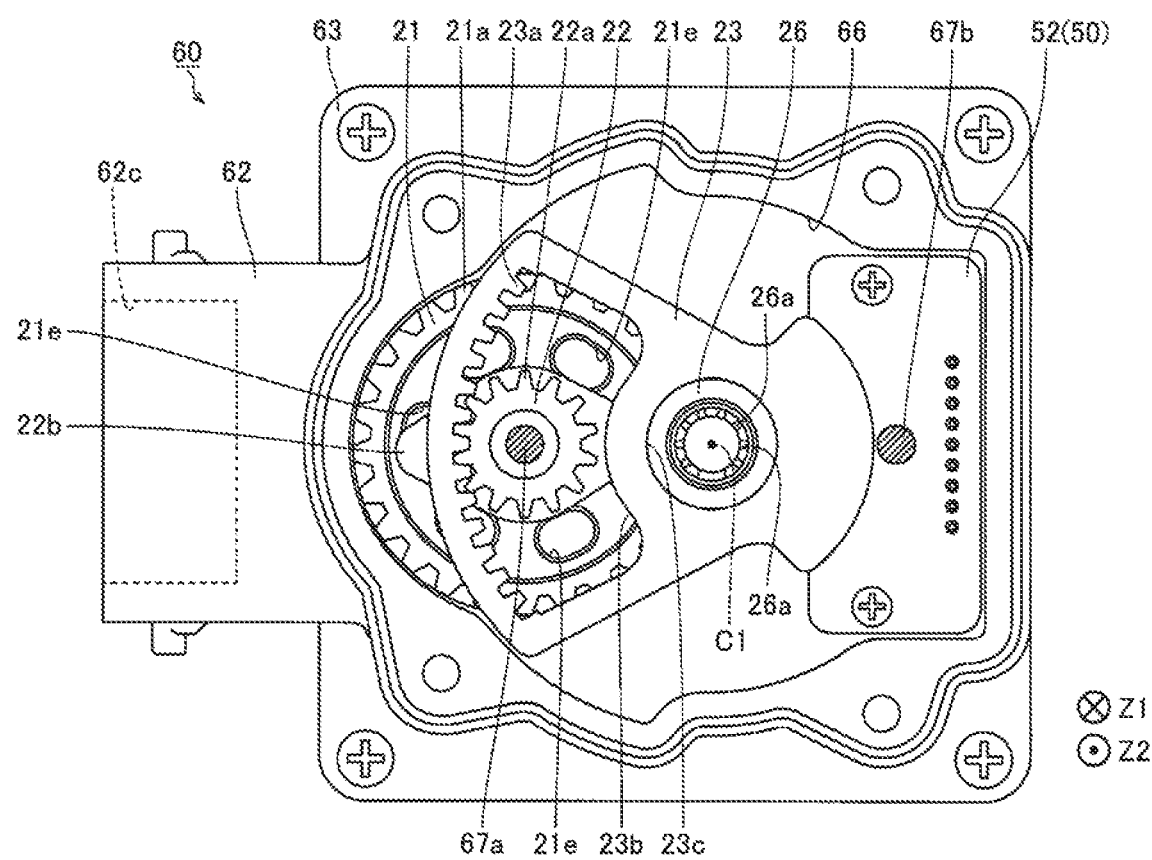
FIG. 5 is a diagram showing an internal structure of a speed reduction mechanism section in a state where a gear housing is removed from a main body portion in the actuator unit constituting the shift device according to the embodiment disclosed here.

The speed reduction mechanism section 20 is configured to rotate the detent plate 71 in a state where the rotation speed transmitted from the motor 10 is reduced. Specifically, as shown in FIGS. 4 and 5, the speed reduction mechanism section 20 includes the gear section 11c of the rotor 11, an intermediate gear 21 that has a gear section 21a meshing with the gear section 11c (intermediate gear 21 provided on the motor 10 side), an intermediate gear 22 that is disposed on the lower face side (Z2 side) in the same axial center as the intermediate gear 21 and engages with the intermediate gear 21 (intermediate gear 22 provided on the detent plate 71 side), and a final gear 23 that has a gear section 23a meshing with a gear section 22a of the intermediate gear 22. Further, the lower end portion of the shaft pinion 11a is supported by the bearing member 2, so that the gear section 11c crosses the gear chamber 66 in the vertical direction (Z direction). The intermediate gear 21 is rotatably supported by a bearing member 4 with respect to the support shaft 67a inserted into the through hole of the motor housing 62. The intermediate gear 22 is rotatably supported by a substantially cylindrical bearing member 5 fitted into the support shaft 67a. The intermediate gear 21 and the intermediate gear 22 are coaxially stacked. The intermediate gear 21 and the intermediate gear 22 are examples of a "driving-side member" and a "driven-side member" in the claims, respectively.

Figure 6:
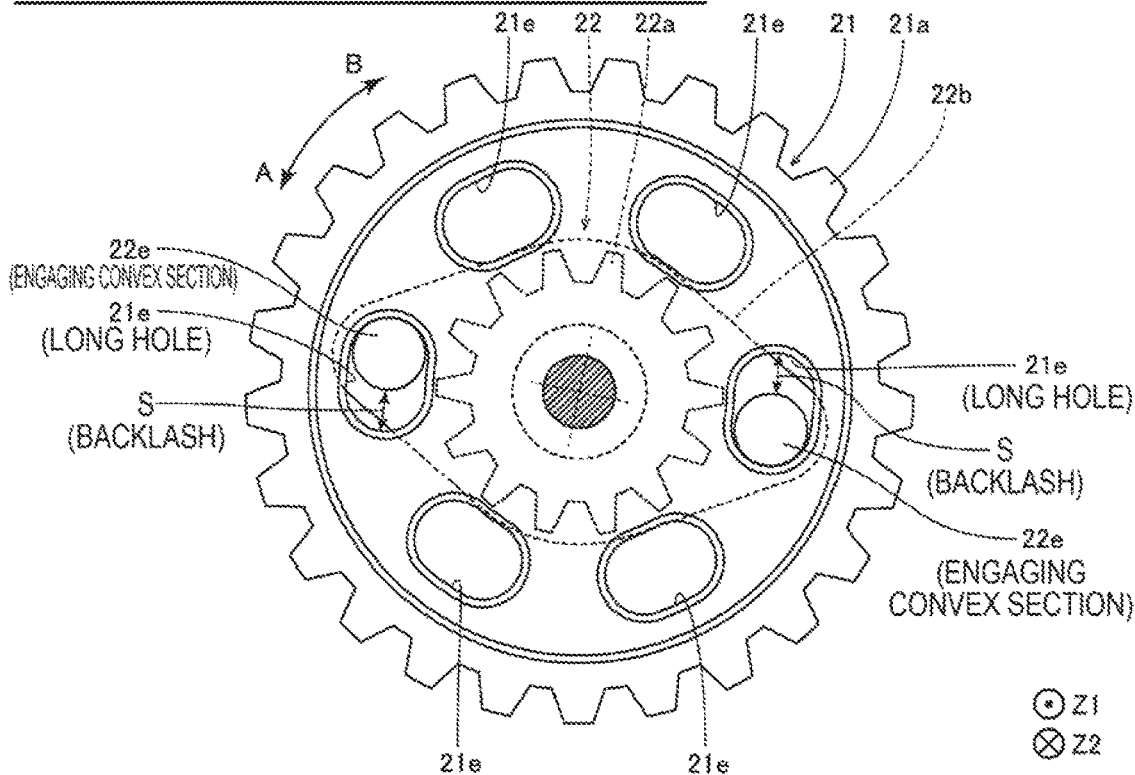
FIG. 6 is a diagram showing an engaged state (state of being able to transmit driving force) of an intermediate gear in the actuator unit constituting the shift device according to the embodiment disclosed here.
Figure 7:
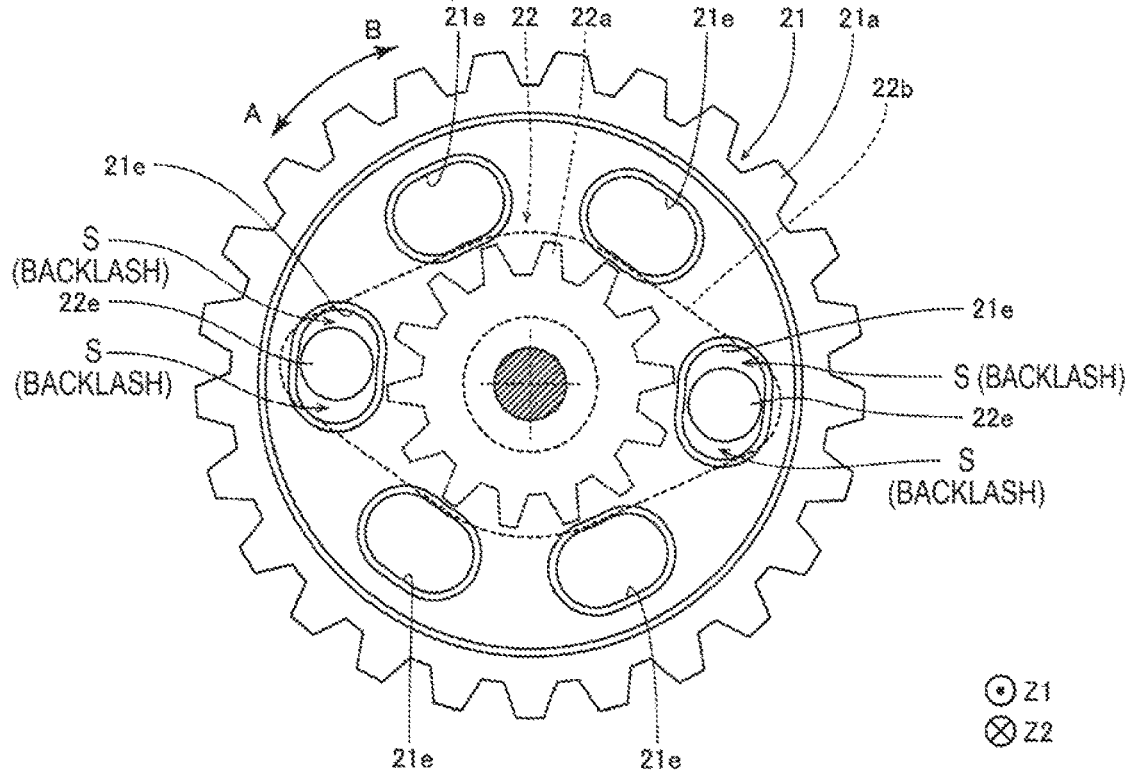
FIG. 7 is a diagram showing an engaged state (state of being unable to transmit driving force) of the intermediate gear in the actuator unit included in the shift device according to the embodiment disclosed here.

As shown in FIGS. 6 and 7, the intermediate gear 21 is provided with a plurality (six) of long holes 21e, of which long diameters extending along a circumferential direction between a rotation center portion and an outer peripheral portion (gear section 21a). The long holes 21e are disposed at intervals of 60° from each other in the circumferential direction. The intermediate gear 22 has an elliptical main body portion 22b provided with a gear section 22a and is provided with a plurality (two) of columnar engaging convex sections 22e protruding upward from an upper face (Z1 side) of the main body portion 22b on a side opposite to the gear section 22a. The engaging convex sections 22e are arranged in a peripheral portion on both sides in a long radial direction in the main body portion 22b. Then, in a state where the intermediate gear 22 is disposed adjacent to the intermediate gear 21 from the lower side to the upper side (Z1 side), each of the engaging convex sections 22e arranged at an interval of 180° is configured so as to be inserted into (engaged with) each of the two long holes 21*e* of the intermediate gear 21.

The engaging convex section 22*e* is fitted into the long hole 21*e* of the intermediate gear 21 through a backlash S having a predetermined size (length in the circumferential direction). That is, as shown in FIG. 7, the intermediate gear 21 and the intermediate gear 22 are configured so as to allow relatively free rotation (free rotation) therebetween by the backlash S (predetermined angle width) in the circumferential direction generated between the engaging convex section 22*e* and the long hole 21*e* that are fitted to each other. Therefore, the intermediate gear 21 and the intermediate gear 22 do not always rotate integrally, and the intermediate gear 21 is configured such that rotation transmitted to the intermediate gear 21 is transmitted to the intermediate gear 22 by allowing the relatively free rotation (free rotation) in one direction (arrow A direction) or the other direction (arrow B direction) at a predetermined angle width. FIG. 6 shows a state where the driving force can be transmitted from the intermediate gear 21 to the intermediate gear 22, and FIG. 7 shows a state where the driving force cannot be transmitted from the intermediate gear 21 to the intermediate gear 22.

As shown in FIG. 5, the gear section 22*a* of the intermediate gear 22 meshes with the gear section 23*a* of the fan-shaped final gear 23 that is incorporated so as to be integrally rotated with the output bearing section 26 in a state of having the same rotation axis C1 as the output bearing section 26. The gear section 23*a* is formed as an internal gear inside a substantially arc-shaped insertion hole 23*b* provided in the final gear 23 along an outer peripheral edge. The gear section 23*a* is formed of a gear having a larger diameter than the gear section 22*a*. In the final gear 23, the output bearing section 26 is fixed to a fitting hole 23*c* having a rotation center at the position of a fan-shaped "pivot (keystone)". The speed reduction mechanism section 20 is configured such that a speed of the rotation of the shaft pinion 11*a* is reduced on the output shaft 25 side by the intermediate gear 21, the intermediate gear 22, and the final gear 23.

The speed reduction mechanism section 20 is configured such that the speed reduction ratio is 1:50. That is, when the rotor 11 is rotated 50 times (24×50=1200 conduction step for the motor 10), the output shaft 25 is configured to make one rotation. Therefore, in the motor 10, since the rotor 11 is rotated by 15° in the one conduction step, so that the output shaft 25 is rotated by 0.3° (=15/50).

A plurality of longitudinal groove sections (serrations) 26*a* extending in the axial direction are formed in the inner periphery of the recess portion at the lower end portion (Z2 side) of the output bearing section 26. Further, a plurality of longitudinal groove sections (serrations) 25*a* extending in the axial direction are formed on the outer periphery of the upper end portion (Z1 side) of the output shaft 25 (see FIG. 4). Thus, the vertical groove portion 25*a* of the output shaft 25 is fitted to and connected to the longitudinal groove sections 26*a* of the output bearing section 26 at an appropriate rotational angle position so that a torque can be transmitted. Therefore, the output shaft 25 in which the detent plate 71 is fixed to the lower end portion (Z2 side) is assembled to the actuator unit 60 at an appropriate rotational angle position.

The rotor rotational angle sensor 30 is configured to detect the rotational angle of the rotor 11. For example, the rotor rotational angle sensor 30 includes a magneto resistive sensor (MR sensor).

The output shaft rotational angle sensor 40 is configured to detect the rotational angle of the detent plate 71 (output shaft 25). For example, the output shaft rotational angle sensor 40 is configured by a Hall element. The rotation position (output angle) of the output shaft 25 is detected as a continuous voltage value.

Next, the relationship between the movement of the shift position and the output values of the output shaft rotational angle sensor 40 and the rotor rotational angle sensor 30 will be described.

Figure 8:
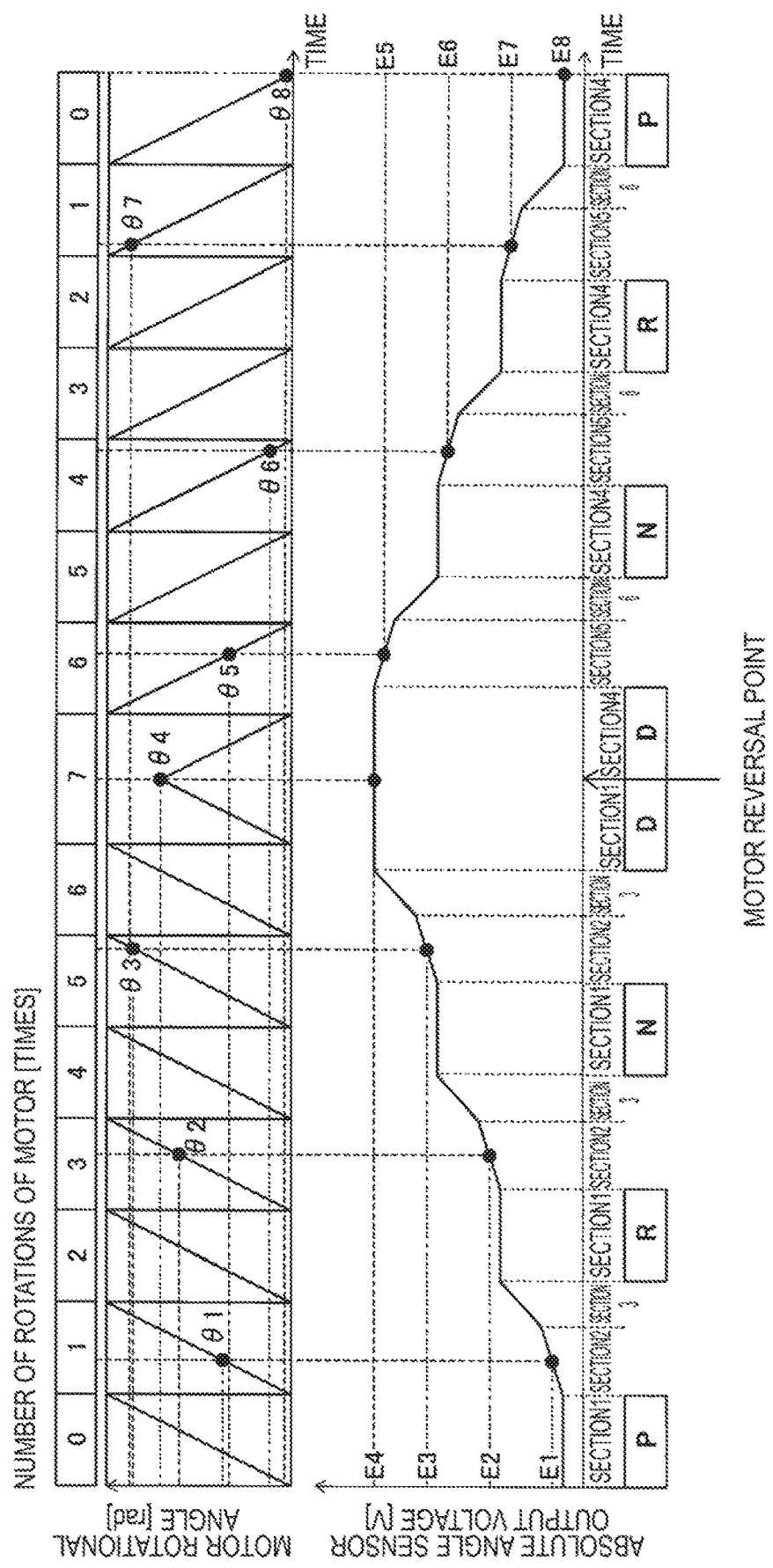
FIG. 8 shows the relationship between the output value (output voltage) of the output shaft rotational angle sensor, the output value of the rotor rotational angle sensor (motor rotational angle), and the number of rotations of a motor in the shift device according to the embodiment disclosed here.

As shown in FIG. 8, as the number of rotations of the motor 10 (0, 1, 2, . . . , 7) increases, the detent plate 71 connected to the output shaft 25 rotates such that the shift position changes in the order of the P position, the R position, the N position, and the D position. At this time, the detent spring 72 fits into the valley parts 80 in the order of the valley parts 81 to 84. The output value of the output shaft rotational angle sensor 40 increases as the number of rotations of the motor 10 increases.

For example, suppose that the roller section 73 is currently fitted into the valley part 81 (P position) (section 1). When the motor 10 (see FIG. 1) is driven, the detent plate 71 is rotated in the direction of arrow A via the speed reduction mechanism section 20 (see FIG. 1). A predetermined amount of backlash S (see FIG. 7) is provided between the intermediate gear 21 and the intermediate gear 22. For this reason, in a state where the roller section 73 is completely fitted into the valley bottom V of the valley part 81 (see section 1 in FIG. 9), although the intermediate gear 21 is rotated with the rotation of the rotor 11, since the engaging convex section 22*e* is engaged inside the long hole 21*e* using the backlash S so that the driving force cannot be transmitted, the intermediate gear 22 is not rotated. As a result, in a section 1, while the rotational angle (rad) of the rotor 11 detected by the rotor rotational angle sensor 30 (see FIG. 1) linearly increases, the voltage level corresponding to the rotational angle of the output shaft 25 detected by the output shaft rotational angle sensor 40 (see FIG. 1) is constant.

Then, in a section 2, one end portion of the long hole 21*e* of the intermediate gear 21 is engaged with the engaging convex section 22*e* of the intermediate gear 22 so as to be able to transmit driving force (see section 2 in FIGS. 6 and 9), the driving force of the motor 10 is transmitted to the output shaft 25 (see FIG. 2) via the gear section 11*c*, the intermediate gear 21, the intermediate gear 22, and the final gear 23 (see FIG. 4). As a result, with the rotation of the detent plate 71 in the direction of arrow A, the roller section 73 moves so as to climb the slope of the valley part 81 (P position) on the side of the valley part 82 (R position) toward the peak part 85. The motor 10 is rotated substantially once at the P position (section 1). Then, in the section 2, the rotational angle (rad) of the rotor 11 detected by the rotor rotational angle sensor 30 (see FIG. 1) linearly increases. Further, the voltage level corresponding to the rotational angle of the output shaft 25 detected by the output shaft rotational angle sensor 40 (see FIG. 1) increases at a constant rate. Further, the engaged state of the intermediate gears 21 and 22 in this state corresponds to the state of FIG. 6.

In a section 3, after the roller section 73 has passed over the peak part 85 at the boundary between the valley part 81 (P position) and the valley part 82 (R position), the detent plate 71 is naturally rotated in the direction of arrow A before the motor 10 (intermediate gear 21). That is, since the detent plate 71 is always urged toward the valley part 82 by the roller section 73, by the biasing force F (see FIG. 3), the detent plate 71 is rotated in the direction of arrow A ahead of the motor 10 within the range of the backlash S of the long hole 21e. Then, the roller section 73 is dropped toward the valley bottom V of the valley part 82 (see section 3 in FIG. 9). At this time, while the rotational angle of the rotor 11 increases, the voltage level corresponding to the rotational angle of the output shaft 25 sharply increases as the roller section 73 falls (sucks) into the valley bottom V.

The operation of moving the shift position from the R position to the N position and the operation of moving the N position to the D position are the same as the operation of moving the shift position from the P position to the R position.

The rotating direction of the motor 10 is reversed. As a result, the shift position is moved to the N position via the D position (section 4), a section 5, and a section 6. The operation at the D position (section 4) is the same as the operation in section 1 described above. That is, while the rotational angle (rad) of the rotor 11 detected by the rotor rotational angle sensor 30 (see FIG. 1) linearly decreases, the voltage level corresponding to the rotational angle of the output shaft 25 detected by the output shaft rotational angle sensor 40 (see FIG. 1) is constant. The operation in the section 5 is the same as the operation in the section 2 described above. That is, in the section 5, the rotational angle of the rotor 11 decreases linearly, and the voltage level corresponding to the rotational angle of the output shaft 25 decreases at a constant rate. The operation in the section 6 is the same as the operation in the section 3 described above. That is, while the rotational angle of the rotor 11 decreases, the voltage level corresponding to the rotational angle of the output shaft 25 sharply decreases as the roller section 73 falls (sucks) into the valley bottom V.

Here, in the present embodiment, the shift device 100 associates (learns) the output value of the output shaft rotational angle sensor 40 and the output value of the rotor rotational angle sensor 30 at a predetermined position of the detent spring 72 with respect to the valley part 80 of the detent plate 71. The shift device 100 is configured to detect the number of rotations of the motor 10 based on the above-described association. The above-described association and the detection of the number of rotations of the motor 10 are performed by the ECU 50. The association is performed, for example, when the shift device 100 is shipped, when the shift device 100 is assembled (when the shift device 100 is reassembled), and the like. Hereinafter, a specific description will be given.

Figures 9, 10:
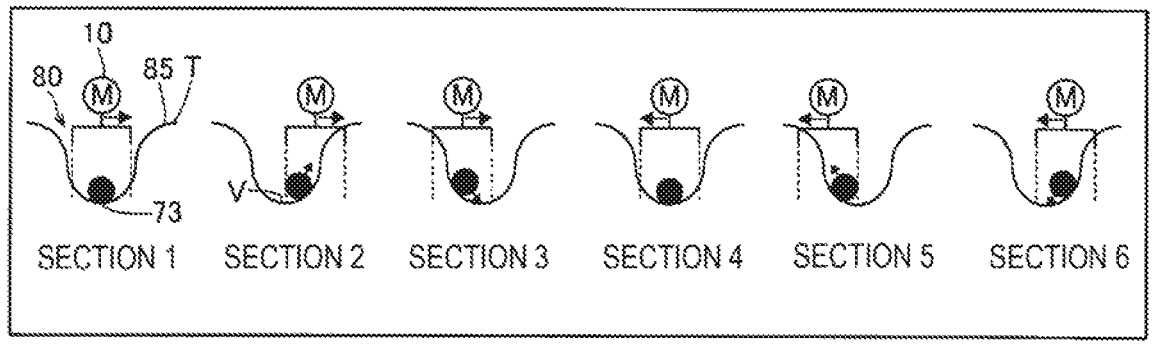
FIG. 9 is a diagram showing a relationship between a rotary shaft and an output shaft of the motor.
FIG. 10 is a diagram showing a map in which output values (output voltages) of an output shaft rotational angle sensor and output values (integrated values) of a rotor rotational angle sensor are associated with each other.

In the present embodiment, the shift device 100 (ECU 50) includes a nonvolatile storage section 90 as shown in FIG. 1. As shown in FIG. 10, the storage section 90 stores the association of the output value of the output shaft rotational angle sensor 40 and the output value of the rotor rotational angle sensor 30 (integrated value) at a predetermined position of the detent spring 72 with respect to the valley part 80 of the detent plate 71. Specifically, the storage section 90 stores a map 91 in which the output value of the output shaft rotational angle sensor 40 and the output value of the rotor rotational angle sensor 30 at the above-described predetermined position are associated. The shift device 100 (ECU 50) is configured to detect the number of rotations of the motor 10 based on the map 91 stored in the storage section 90.

For example, the map 91 is formed in which the output value of the output shaft rotational angle sensor 40 and the output value of the rotor rotational angle sensor 30 are associated with each other at the point of "black circle" shown in FIG. 8. For example, in the section 2 between the position P and the position R, an output value E1 of the output shaft rotational angle sensor 40 and the output value (integrated value: Y) of the rotor rotational angle sensor 30 are associated with each other. The integrated value Y is represented by a relational expression of $Y=2\pi \times$number of rotations n+motor rotational angle (rad).

Figure 11:
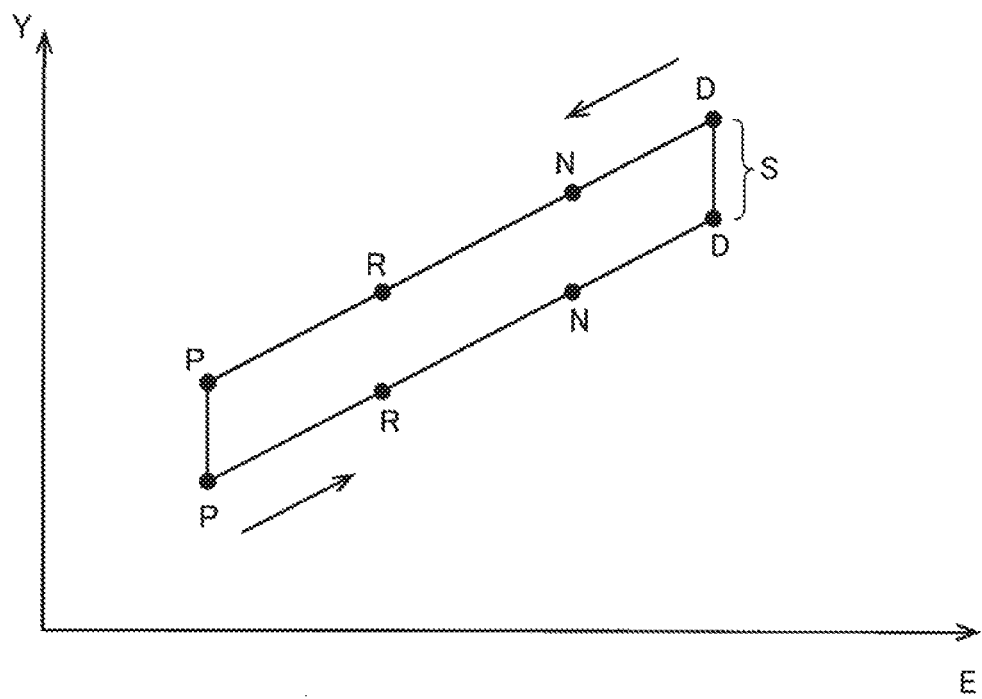
FIG. 11 is a diagram for explaining a relationship between an output value (output voltage E) of an output shaft rotational angle sensor and an output value (integrated value Y) of a rotor rotational angle sensor.

As shown in FIG. 11, the output value E (horizontal axis) of the output shaft rotational angle sensor 40 increases as the shift position moves to the P position, the R position, the N position, and the D position (hereinafter, referred to as a forward path). As the output value E increases, the integrated value Y increases. Further, the output value E (horizontal axis) of the output shaft rotational angle sensor 40 decreases as the shift position moves to the D position, the N position, the R position, and the P position (hereinafter, referred to as a return path). As the output value E decreases, the integrated value Y decreases. The output value E on the forward path and the output value E on the return path are shifted by the amount of the backlash S.

In the present embodiment, the output values of the output shaft rotational angle sensor 40 and the output values of the rotor rotational angle sensor 30 at a plurality of predetermined positions are associated with each other when the motor 10 is rotated in the first direction and when the motor 10 is rotated in the second direction opposite to the first direction. Specifically, the motor 10 is rotated in the first direction so that the detent plate 71 is rotated in the direction of arrow A. The output value of the output shaft rotational angle sensor 40 and the output value of the rotor rotational angle sensor 30 (integrated value) in the section 2 between the position P and the position R, the section 2 between the position R and the position N, and the section 2 between the position N and the position D are associated with each other. The motor 10 is rotated in the second direction so that the detent plate 71 is rotated in the direction of arrow B. The output value of the output shaft rotational angle sensor 40 and the output value of the rotor rotational angle sensor 30 in the section 5 between the position D and the position N, the section 5 between the position N and the position R, and the section 5 between the position R and the position P are associated with each other.

In the present embodiment, the above-described predetermined position is a position between the valley bottom V of the valley part 80 of the detent plate 71 and the top portion T separating the valley parts 80 adjacent to each other. Specifically, the above-described predetermined position is a position until the detent spring 72 moves from the valley bottom V of the valley part 80 to the top portion T of the peak part 85 of the detent plate 71. That is, as described above, in the section 2 and the section 5, the output value of output shaft rotational angle sensor 40 and the output value of rotor rotational angle sensor 30 are associated with each other.

In the present embodiment, the number of rotations of the motor 10 is detected based on the association between the output value of the output shaft rotational angle sensor 40 and the output value of the rotor rotational angle sensor 30 in a state where the backlash S between the intermediate gear 21 and the intermediate gear 22 is reduced. Specifically, in the section 2 and the section 5 in which the backlash S between the intermediate gear 21 and the intermediate gear 22 is reduced, the output value of the output shaft rotational angle sensor 40 is associated with the output value of the rotor rotational angle sensor 30.

Next, detection of the number of rotations of the motor 10 will be specifically described. The detection of the number of rotations of the motor 10 is performed by the ECU 50.

First, the ECU 50 is started (restarted).

Next, the motor rotational angle (rotational angle of the rotor 11: rad) is detected by the rotor rotational angle sensor 30. At this stage, the rotational angle (rad) of the rotor 11 is detected, while the number of rotations of the rotor 11 is unknown.

Next, the output value of the output shaft rotational angle sensor 40 is detected. For example, it is assumed that the output value of the output shaft rotational angle sensor 40 is Ex.

Next, the map 91 stored in the nonvolatile storage section 90 is referred to. In the map 91, the output value of the output shaft rotational angle sensor 40 and the output value (integrated value) of the rotor rotational angle sensor 30 are associated at a plurality of predetermined positions. Here, it is assumed that the output value Ex of the output shaft rotational angle sensor 40 is a value between the output value E1 and the output value E2.

Here, in the present embodiment, the number of rotations of the motor 10 is detected based on linear interpolation of association at a plurality of predetermined positions. That is, since the output value Ex of the output shaft rotational angle sensor 40 is a value between the output value E1 and the output value E2, an integrated value (referred to as Yx) corresponding to the output value Ex is calculated by linear interpolation between the output value E1 and the output value E2. Then, the number of rotations n corresponding to Yx is obtained based on a relational expression of $Y=2\pi \times$ number of rotations n+motor rotational angle (rad). In FIG. 8, for simplicity of description, only eight black circles (associated positions) are shown, but in practice, the above-described association is performed at many more points than eight points (such as 80 positions).

Due to the backlash S between the intermediate gear 21 and the intermediate gear 22, an error may occur in the detection of the number of rotations of the rotor 11. That is, in the section 1 and the section 4, even when the rotor 11 rotates, the output value of the output shaft rotational angle sensor 40 is constant (does not change). Therefore, when the number of rotations of the rotor 11 is switched (for example, when switching from n−1 rotation to n rotation), an error may occur in the detection of the number of rotations.

In the present embodiment, based on the rotational angle of the rotor 11 detected by the rotor rotational angle sensor 30, the number of rotations of the motor 10 detected based on the association is corrected. Specifically, it is assumed that the integrated value Yx is calculated as described above based on the output value (linear interpolation) of the output shaft rotational angle sensor 40. Since the integrated value Y has a relationship of $2\pi \times$ the number of rotations n+the motor rotational angle, the motor rotational angle in the case of the integrated value Yx is obtained (referred to as a rotational angle rad1). The rotational angle rad1 is compared with the rotational angle (referred to as rad2) of the rotor 11 detected by the rotor rotational angle sensor 30 when the ECU 50 is started. Then, based on the difference between the rotational angles rad1 and rad2, (for example, if the difference exceeds a predetermined threshold), the detected number of rotations n is corrected to, for example, n−1. That is, since the backlash S is provided, the output shaft 25 may rotate before the rotor 11 due to the biasing force F. In this case, while the number of rotations n is detected from the output value of the output shaft rotational angle sensor 40, the number of rotations may actually be n−1. Therefore, the number of rotations detected as described above is corrected.

In the present embodiment, the following effects can be obtained.

In the present embodiment, as described above, the output value of the output shaft rotational angle sensor 40 and the output value of the rotor rotational angle sensor 30 at a predetermined position of the detent spring 72 with respect to the valley part 80 of the detent plate 71 are associated with each other and the number of rotations of the motor 10 is detected based on the association. Thereby, even when the motor 10 moves due to an external force or the like or when the power supply fails (that is, when the current number of rotations of the motor 10 is not stored in the storage section 90), the number of rotations of the motor 10 at the time of restart is detected based on the above-described association when the shift device 100 is restarted. As a result, the number of rotations of the motor 10 is accurately detected, so that it is possible to prevent the positioning accuracy of the shift position from being deteriorated due to erroneous recognition of the number of rotations of the motor 10.

For example, unlike the case where the detent spring 72 is pressed against the wall portion of the detent plate 71 to set the rotation start point of the detent plate 71, the number of rotations of the motor 10 can be detected without pressing the detent spring 72 against the wall portion or the like of the detent plate 71, so that a decrease in durability of the detent plate 71 can be suppressed.

In the present embodiment, as described above, since the above-described association at a predetermined position is stored in the nonvolatile storage section 90, the number of rotations of the motor 10 can be immediately detected by referring to the above-described association stored in the nonvolatile storage section 90 when the shift device 100 is restarted.

In the present embodiment, as described above, since the above-described association is stored as the map 91, the number of rotations of the motor 10 can be easily detected by referring to the map 91 from the output value of the output shaft rotational angle sensor 40.

In the present embodiment, as described above, the number of rotations of the motor 10 can be accurately detected both when the motor 10 is rotated in the first direction and when the motor 10 is rotated in the second direction.

In the present embodiment, as described above, since the above-described association is performed at a position from the valley bottom V of the valley part 80 of the detent plate 71 where the output value of the output shaft rotational angle sensor 40 changes with the rotation of the motor 10 to the top portion T of the peak part 85 separating the adjacent valley parts 80, the number of rotations of the motor 10 can be accurately detected based on the output value of the output shaft rotational angle sensor 40.

In the present embodiment, as described above, even when the backlash S is (intentionally) provided between the intermediate gear 21 and the intermediate gear 22, since the above-described association is performed in a state where the backlash S between the intermediate gear 21 and the intermediate gear 22 is reduced, the number of rotations of the motor 10 can be accurately detected.

Further, in the present embodiment, as described above, the number of rotations of the motor 10 can be detected based on discrete association without continuously performing the above-described association. Accordingly, the number of the associations stored in the storage section 90 can be reduced, so that an increase in the capacity of the storage section 90 can be suppressed.

In the present embodiment, as described above, since the output shaft 25 rotates without preceding the rotation of the motor 10 moving from the valley bottom V of the valley part

80 to the top portion T of the peak part 85 of the detent plate 71, the number of rotations of the motor 10 can be detected more accurately.

In the present embodiment, as described above, the number of rotations of the motor 10 is corrected, so that the number of rotations of the motor 10 can be detected more accurately.

Modification Example

It should be understood that the embodiment disclosed this time is to be considered in all respects as illustrative and not restrictive. The scope of this disclosure is defined by the terms of the claims, rather than the description of the embodiments, and includes all equivalents (modifications) within the scope and meaning equivalent to the claims.

For example, in the above-described embodiment, an example is described in which the association between the output value of the output shaft rotational angle sensor and the output value of the rotor rotational angle sensor is represented by a map, but the embodiment disclosed here is not limited to this. For example, the association between the output value of the output shaft rotational angle sensor and the output value of the rotor rotational angle sensor may be expressed by an arithmetic expression.

In the above-described embodiment, an example is described in which the output value of the output shaft rotational angle sensor at 80 positions and the output value of the rotor rotational angle sensor 30 are associated, but this disclosure is not limited to this. For example, the association may be performed at positions other than the 80 positions. Specifically, when the accuracy of the rotor rotational angle sensor and the output shaft rotational angle sensor is high, it is possible to reduce the number of positions to be associated.

In the above-described embodiment, an example is described in which a predetermined amount of backlash is intentionally provided between the intermediate gear (driving-side member) and the intermediate gear (driven-side member), but this disclosure is not limited to this. For example, a predetermined amount of backlash may not be intentionally provided between the intermediate gear (driving-side member) and the intermediate gear (driven-side member). Even if an intentional predetermined amount of backlash is not provided, mechanical components included in the shift device generally include unintended backlash (play).

In the above-described embodiment, an example is described in which the number of rotations of the motor detected based on the association is corrected based on the rotational angle of the rotor detected by the rotor rotational angle sensor, but this disclosure is not limited to this. For example, when the backlash is extremely small (when the number of rotations of the motor is not erroneously detected), it is not necessary to correct the number of rotations of the motor.

In the above-described embodiment, an example is described in which the number of shift positions is four (P, R, N, and D), but this disclosure is not limited to this. For example, disclosed here can be applied to shift positions having a number other than four.

In the above-described embodiment, an example is described in which the shift device disclosed here is applied to a shift device for an automobile, but this disclosure is not limited to this. The shift device disclosed here may be applied to, for example, a shift device other than for a car, such as an aircraft or a ship.

A shift device according to an aspect of this disclosure is configured to be mounted on a vehicle, and includes a shift switching member that includes a plurality of valley parts corresponding to a shift position, a positioning member that is provided to establish the shift position in a state of being fitted into any one of the plurality of valley parts of the shift switching member, a motor including a rotor and a stator and driving the shift switching member, a speed reduction mechanism section that rotates the shift switching member in a state in which a rotation speed transmitted from the motor is reduced, a rotor rotational angle sensor that detects a rotational angle of the rotor, and an output shaft rotational angle sensor that detects a rotational angle of the shift switching member in which the shift device is configured to associate an output value of the output shaft rotational angle sensor and an output value of the rotor rotational angle sensor at a predetermined position of the positioning member with respect to at least one valley part of the plurality of valley parts and detect the number of rotations of the motor based on the association.

In the shift device according to the aspect of this disclosure, as described above, the output value of the output shaft rotational angle sensor and the output value of the rotor rotational angle sensor at a predetermined position of the positioning member with respect to the valley part of the shift switching member are associated with each other and the number of rotations of the motor is detected based on the association. Thereby, even when the motor moves due to an external force or the like or when the power supply fails (that is, when the current number of rotations of the motor is not stored in the storage section), the number of rotations of the motor at the time of restart is detected based on the above-described association when the shift device is restarted. As a result, the number of rotations of the motor is accurately detected, so that it is possible to prevent the positioning accuracy of the shift position from being deteriorated due to erroneous recognition of the number of rotations of the motor.

Further, for example, unlike the case where the positioning member is pressed against the wall portion of the shift switching member to set the rotation start point of the shift switching member, the number of rotations of the motor can be detected without pressing the positioning member against the wall portion of the shift switching member, so that a decrease in durability of the shift switching member can be suppressed.

It is preferable that the shift device according to the aspect of this disclosure further includes a nonvolatile storage section that stores the association between the output value of the output shaft rotational angle sensor and the output value of the rotor rotational angle sensor at the predetermined position.

With this configuration, since the above-described association at a predetermined position is stored in the nonvolatile storage section, the number of rotations of the motor can be immediately detected by referring to the above-described association stored in the nonvolatile storage section when the shift device is restarted.

In the shift device according to the aspect of this disclosure, it is preferable that the storage section stores a map in which the output value of the output shaft rotational angle sensor and the output value of the rotor rotational angle sensor at the predetermined position are associated with each other, and the shift device is configured to detect the number of rotations of the motor based on the map stored in the storage section.

With this configuration, since the above-described association is stored as a map, the number of rotations of the motor can be easily detected by referring to the map from the output value of the output shaft rotational angle sensor.

In the shift device according to the aspect of this disclosure, it is preferable that the shift device is configured to associate the output values of the output shaft rotational angle sensor and the output values of the rotor rotational angle sensor at a plurality of the predetermined positions when the motor is rotated in a first direction and when the motor is rotated in a second direction opposite to the first direction.

Here, the mechanical components included in the shift device generally include backlash (play). Specifically, an assembling error at the time of manufacturing and an error in mechanical operation (slight rattling such as backlash between gear members) included in the driving force transmission mechanism interposed between the actuator and the shift switching member included in the shift device occur. Therefore, the correspondence between the output value of the output shaft rotational angle sensor and the number of rotations of the motor differs between when the motor is rotated in the first direction and when the motor is rotated in the second direction. Therefore, by configuring as described above, the number of rotations of the motor can be accurately detected both when the motor is rotated in the first direction and when the motor is rotated in the second direction.

In the shift device according to the aspect of this disclosure, it is preferable that the predetermined position is a position from a valley bottom of the valley part of the shift switching member to a top portion of a peak part separating the adjacent valley parts.

Here, due to the backlash included in mechanical components included in the shift device, the shift switching member may not rotate even when the motor rotates. In this case, since the shift switching member does not rotate, the output value of the output shaft rotational angle sensor does not change. Therefore, as described above, since the above-described association is performed at a position from the valley bottom of the valley part of the shift switching member where the output value of the output shaft rotational angle sensor changes with the rotation of the motor to the top portion of the peak part separating the adjacent valley parts, the number of rotations of the motor can be accurately detected based on the output value of the output shaft rotational angle sensor.

In the shift device according to the aspect of this disclosure, it is preferable that the speed reduction mechanism section includes a driving-side member that is provided at a motor side and a driven-side member that is provided in the shift switching member and is rotated according to rotation of the driving-side member. A predetermined amount of a backlash (S) is provided between the driving-side member and the driven-side member, and the driving-side member and the driven-side member are configured to be rotatable relative to each other by the predetermined amount of the back lash. The number of rotations of the motor is detected based on the association between the output values of the output shaft rotational angle sensor and the output values of the rotor rotational angle sensor in a state where the backlash between the driving-side member and the driven-side member is reduced.

With this configuration, even when the backlash is (intentionally) provided between the driving-side member and the driven-side member, since the above-described association is performed in a state where the backlash between the driving-side member and the driven-side member is reduced, the number of rotations of the motor can be accurately detected.

In the present application, the following configuration is also conceivable in the shift device according to the above-described aspect.

Appendix 1

That is, in the shift device in which the number of rotations of the motor is detected based on the map stored in the storage section, in the map, the output values of the output shaft rotational angle sensor and the output values of the rotor rotational angle sensor are associated with each other at a plurality of the predetermined positions, and the number of rotations of the motor is detected based on a linear interpolation of the association at the plurality of the predetermined positions.

With this configuration, the number of rotations of the motor can be detected based on discrete association without performing the above-described association continuously. Accordingly, the number of the associations stored in the storage section can be reduced, so that an increase in the capacity of the storage section can be suppressed.

Appendix 2

In the shift device in which the predetermined position is the position from the valley bottom of the valley part to the top portion of a peak part, the predetermined position is a position until the positioning member moves from the valley bottom of the valley part to the top portion of the peak part of the shift switching member.

When the positioning member has a biasing force, the positioning member may move from the top portion of the peak part to the valley bottom of the valley part of the shift switching member prior to rotation of the motor. In this case, while the output value of the output shaft rotational angle sensor changes rapidly, the rate of change of the rotational angle of the motor is constant. That is, the output value of the output shaft rotational angle sensor may not correspond to the rotational angle of the motor in some cases. Therefore, by configuring as described above, since the output shaft rotates without preceding the rotation of the motor in a period of moving from the valley bottom of the valley part to the top portion of the peak part of the shift switching member, the number of rotations of the motor can be detected more accurately.

Appendix 3

In the shift device according to the aspect of this disclosure, the shift device is configured to correct the number of rotations of the motor detected based on the association, and the correction is made based on the rotational angle of the rotor detected by the rotor rotational angle sensor.

Here, the number of rotations of the motor detected based on the output value of the output shaft rotational angle sensor may be incorrect due to backlash or the like included in mechanical components included in the shift device. Therefore, by configuring as described above, the number of rotations of the motor is corrected, so that the number of rotations of the motor can be detected more accurately.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A shift device configured to be mounted on a vehicle, the shift device comprising:
    a shift switching member that includes a plurality of valley parts corresponding to a shift position;
    a positioning member that is provided to establish the shift position in a state of being fitted into any one of the plurality of valley parts of the shift switching member;
    a motor including a rotor and a stator and driving the shift switching member;
    a speed reduction mechanism section that rotates the shift switching member in a state in which a rotation speed transmitted from the motor is reduced;
    a rotor rotational angle sensor that detects a rotational angle of the rotor; and
    an output shaft rotational angle sensor that detects a rotational angle of the shift switching member, wherein
    the shift device is configured to associate an output value of the output shaft rotational angle sensor and an output value of the rotor rotational angle sensor at a predetermined position of the positioning member with respect to at least one valley part of the plurality of valley parts of the shift switching member and detect the number of rotations of the motor based on the association, and
    the predetermined position is a position between a valley bottom of the valley part of the shift switching member to a top portion of a peak part separating the adjacent valley parts.

2. The shift device according to claim 1, further comprising:
    a nonvolatile storage section that stores the association between the output value of the output shaft rotational angle sensor and the output value of the rotor rotational angle sensor at the predetermined position.

3. The shift device according to claim 2, wherein
    the storage section stores a map in which the output value of the output shaft rotational angle sensor and the output value of the rotor rotational angle sensor at the predetermined position are associated with each other, and
    the shift device is configured to detect the number of rotations of the motor based on the map stored in the storage section.

4. The shift device according to claim 3, wherein
    in the map, the output values of the output shaft rotational angle sensor and the output values of the rotor rotational angle sensor are associated with each other at a plurality of the predetermined positions, and
    the number of rotations of the motor is detected based on a linear interpolation of the association at the plurality of the predetermined positions.

5. The shift device according to claim 1, wherein
    the shift device is configured to associate the output values of the output shaft rotational angle sensor and the output values of the rotor rotational angle sensor at a plurality of the predetermined positions when the motor is rotated in a first direction and when the motor is rotated in a second direction opposite to the first direction.

6. The shift device according to claim 1, wherein
    the speed reduction mechanism section includes a driving-side member that is provided at a motor side, and a driven-side member that is provided in the shift switching member and is rotated according to rotation of the driving-side member,
    a predetermined amount of a backlash is provided between the driving-side member and the driven-side member, and the driving-side member and the driven-side member are configured to be rotatable relative to each other by the predetermined amount of the backlash, and
    the number of rotations of the motor is detected based on the association between the output values of the output shaft rotational angle sensor and the output values of the rotor rotational angle sensor in a state where the backlash between the driving-side member and the driven-side member is reduced.

7. The shift device according to claim 1, wherein
    the shift device is configured to correct the number of rotations of the motor detected based on the association, and the correction is made based on the rotational angle of the rotor detected by the rotor rotational angle sensor.

* * * * *